April 23, 1935.  J. R. BAILEY  1,998,485
PROCESS FOR OBTAINING ORGANIC NITROGEN BASES
Filed Dec. 31, 1932
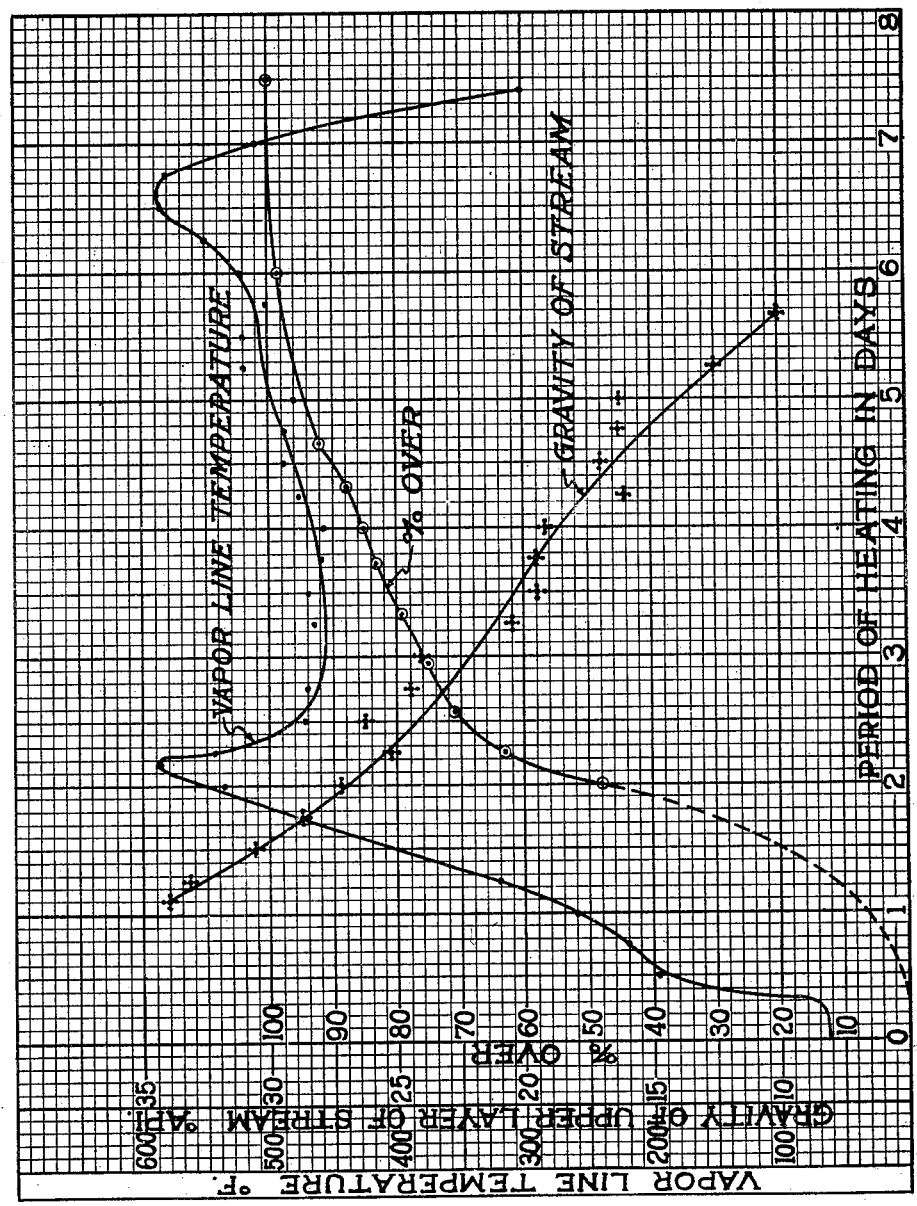
INVENTOR.
James R. Bailey
BY
ATTORNEY.

Patented Apr. 23, 1935

1,998,485

UNITED STATES PATENT OFFICE 1,998,485

PROCESS FOR OBTAINING ORGANIC NITROGEN BASES

James R. Bailey, Austin, Tex., assignor to Union Oil Company of California, Los Angeles, Calif., a corporation of California Application December 31, 1932, Serial No. 649,687

24 Claims. (Cl. 260—119)

This invention relates to a process for obtaining nitrogenous organic compounds of a basic nature and a carbon residue from protein materials by heating the latter to temperatures sufficiently high to cause complex chemical reactions of the protein molecule. More especially, it relates to a process for obtaining these nitrogenous compounds and carbon residue by pyrolytically distilling cottonseed meal.

Cottonseed meal, after substantially all of the oil has been removed by any of the well known pressing processes, contains about 40% of protein. Most proteins are composed of about half a dozen elements, the relative proportions of which vary between narrow limits. Carbon, hydrogen, oxygen, nitrogen, sulphur and sometimes phosphorus are usually the only elements encountered on analysis.

I have discovered that by subjecting an organic material, rich in protein, to a pyrogenic distillation, nitrogenous compounds, a large proportion of which is of a basic nature and very similar to the nitrogenous basic compounds which may be extracted from petroleum distillates, are produced in addition to some other compounds to be described hereinafter. These compounds are the result of chemical changes of the protein molecule which take place during the heating and are of a more simple atomic structure than the material from which they are generated. They are quite stable and may contain either all or some of the elements present in the original protein material. The heating of the protein containing material is preferably carried out in the presence of a suitable hydrocarbon oil.

It is, therefore, an object of my invention to provide a simple and efficient process for decomposing proteinaceous material into compounds containing either all or some of the elements present in the original protein material.

It is another object of my invention to provide a simple and efficient process for decomposing cottonseed meal into nitrogenous compounds of varying basicity and a residue of highly activated carbon by subjecting the aforementioned cottonseed meal to a pyrogenic distillation.

Broadly stated, my invention comprises a process for pyrolytically distilling an organic material of a substantial protein content and in doing so bringing about a chemical reaction of the protein molecule, resulting in the formation of organic nitrogen compounds of varying basic strength including aromatic bases of the quinoline type, hydroaromatic bases of the piperidine type and also non-basic nitrogen compounds of the pyrrole type, carbamates and substituted carbamates, and a residue of highly activated carbon.

In a narrower sense, my invention comprises a process for obtaining any or all of the compounds referred to above, by pyrolytically distilling cottonseed meal in the presence of a lubricating oil of medium viscosity, preferably free from nitrogen compounds, or any other petroleum distillate which is sufficiently fluid to allow efficient agitation of the mass to be heated and yet sufficiently heavy to retain the cottonseed meal in suspension.

A large number of basic nitrogen compounds, referred to above, are obtained as an overhead condensate dissolved in the lubricating oil. On extraction of the nitrogen bases from the oil in which they are present, one obtains a mixture of bases, the component members of which are of two kinds: one kind is soluble in all proportions in petroleum ether and agrees in all its properties very closely with the nitrogen bases which may be extracted from petroleum distillates, for instance, by the process disclosed in my copending application Serial No. 590,913; the other kind of nitrogen bases produced by the process as outlined above, is insoluble in petroleum ether, has a higher nitrogen content than the former type of bases as well as a lower refractivity and higher pH value and is usually present in larger amounts than the petroleum ether soluble bases. The petroleum ether insoluble bases do not color on exposure to light and appear to be different from the bases obtained from coal tar, shale or bone oil. The higher boiling fractions of these bases appear to consist of compounds which are low melting solids, while the lower boiling fractions are chiefly liquids.

In the petroleum ether soluble bases, there appears to be a preponderance of nitrogen compounds of the quinoline type, i. e. quinoline and alkyl substituted quinolines. Hydroaromatic bases of the piperidine type are also encountered in varying amounts. Non-basic nitrogen compounds of the pyrrole type are also generated in varying amounts as a result of the above mentioned pyrogenic distillation of protein materials.

Considerable amounts of water are produced during the decomposition of the proteinaceous matter. The overhead distillates easily separate into two layers; an oily layer containing the nitrogen bases referred to above and an aqueous layer containing varying amounts of water soluble bases, such as pyridine, dissolved or suspended carbamates as well as large amounts of carbonates and bicarbonates. The two layers may be easily separated and the oily layer is then extracted with a dilute acid to remove the dissolved nitrogen bases therefrom. The acid extract, so obtained, which contains substantially all of the nitrogen bases which were present in the oily layer, is then treated with an inorganic base, such as sodium hydroxide, in sufficient amounts to free the bases as a crude mixture. On extraction of this mixture with petroleum ether, about 15% of the bases present are taken up by this solvent, the remainder being substantially insoluble therein. The petroleum ether soluble bases have an average nitrogen content of about 8%, the bases insoluble in this solvent have a nitrogen content of about 17%.

The water soluble bases present in the aqueous phase of the overhead distillate may be recovered therefrom by the addition of sodium hydroxide or any inorganic base.

A certain amount of tar, containing basic nitrogenous compounds, very similar to those found in the above mentioned oily layer, is also formed during the pyrolytic distillation of the protein material. These bases may be extracted from the tar with dilute acid in the same manner as the bases are extracted from the oil layer. The dehydration of the tar before addition of acid is considered advisable as it contains some occluded water which is saturated with carbonates and bicarbonates and large volumes of $CO_2$ would be generated. The extraction of the basic nitrogenous compounds from the oil or tar may also be performed with liquid sulphur dioxide, according to the well known Edeleanu process (U. S. Patent 911,553). The "extract" phase thus obtained contains large amounts of liquid sulphur dioxide, the nitrogen bases and the $SO_2$ soluble portion of the material extracted. The major portion of the sulphur dioxide is then vaporized from the extract phase. The "extract" remaining after the major portion of the sulphur dioxide has been removed contains a much higher concentration of nitrogen bases than was present in the original material. This extract is then treated with a dilute acid or countercurrent stream of water to extract the bases as water soluble salts. The free nitrogen bases may be obtained from these salts by the addition of an inorganic base such as sodium hydroxide. This method of extracting nitrogen bases has been more fully described and claimed in my copending application Serial No. 590,913.

In addition to the nitrogen bases referred to above, other nitrogen containing compounds are deposited in the still outlet in a sublimed form. A fraction of these compounds is sometimes washed down with the water produced during the pyrogenic distillation and as a result of this, one finds them also in the aqueous layer of the overhead distillate. These compounds are found to be a mixture of ammonium carbamate and substituted carbamates including methylamine carbamate. Varying amounts of complex nitrogenous compounds usually accompany this mixture of carbamates.

Considerable amounts of volatile and non-volatile mercaptans are also produced during the pyrogenic distillation of the proteinaceous materials. They may be removed, especially where the process of heating is carried out under reduced pressure, by the use of suitable traps.

On completion of the heating process, a dark colored residue is left behind in the still. This residue consists in the main of carbon in a highly activated state. Precautions should be taken not to contact this carbon residue with any large amounts of air while the same is still in a highly heated condition as it absorbs oxygen so rapidly that it will become ignited.

The heating of the proteinaceous material is preferably performed over an open fire and under substantially atmospheric pressure. Distillation with superheated steam may be substituted for the heating over an open fire and is helpful in washing down the sublimed products from the cooler part of the still outlet where they are found when distillation over open fire is resorted to. Analogous results to those described above have been obtained by carrying out the aforesaid pyrogenic distillation under excess or reduced pressure.

The following example is given by way of illustration:

Example I

Eight gallons of a nitrogen free, paraffine base lubricating oil and 100 pounds of cottonseed meal were introduced into an iron still, three feet tall and two feet wide. The still itself was covered with asbestos packing to prevent heat loss and was equipped with a stirrer which operated through a stuffing box placed at its top. The oil chosen for this run was of a medium Pennsylvania type and had a viscosity sufficiently high to keep the cottonseed meal in suspension but low enough to allow easy agitation of the mass to be heated. The boiling points of this oil were such that it might be distilled and used over again after the completion of the heating process.

At the beginning of the run a low fire was used because considerable amounts of water and other volatile products came over. The rate of heating was based on the rate of distillation. About 36 to 40 hours of continuous heating was required for a complete distillation. The distilling temperature rose gradually to about 356° F. and then rose more rapidly to a maximum of 590° F.

The rapid rise may have been due to the fact that gas evolution diminished when temperatures above 356° F. were reached and heating could be more rapid. At about 590° F. the distilling temperature fell to around 482° F.–536° F. and remained there to the end of the distillation. At the end of the distillation a residue of carbon remained. The distillate was divided and collected in four liter fractions or cuts as it came over. Cuts were made every four liters:

| Cut | Aqueous layer | Oil layer | Base tar obtained (a) |
|---|---|---|---|
| 1 | 4,000 cc. | 0 cc. | |
| 2 | 4,000 cc. | 0 cc. | |
| 3 | 2,500 cc. | 1,500 cc. | 100 cc. |
| 4 | 1,000 cc. | 3,000 cc. | 300 cc. |
| 5 | 300 cc. | 3,700 cc. | 175 cc. |
| 6 | 100 cc. | 3,900 cc. | 125 cc. |
| 7-11 | 600 cc. | 1,800 cc. | 175 cc. |

(a) The material which was removed with sulphuric acid is marked base tar but is actually only about 15% tar. This tar contains basic nitrogenous compounds which may be obtained by removing any water occluded in the tar, adding sufficient dilute acid to the latter to extract the bases as an aqueous solution of their salts and adding excess caustic in this solution. The free bases so obtained are very similar in their appearance and properties to the bases which may be extracted from the oily layer as previously described.

The water and oil distilling over separated into two layers on condensation. The aqueous layer contained a considerable quantity of solids, especially a white substance which sublimes in needles. Its presence was especially noticeable in cuts 5–8. At this stage only a small quantity of water came over with the oil and this material tended to sublime in the outlet of the still. This material is very soluble in water and is of little trouble in the earlier stages of the distillation. In the case where the recovery of the sublimed products is not desired, or if these products are to be obtained from the aqueous phase of the overhead distillate, steam agitation may be used instead of mechanical agitation. The material coming over toward the end of the distillation consisted principally of lubricating oil. However, experiments indicated that all of the nitrogenous bases are obtainable only on complete distillation of the lubricating oil present in the still charge.

The process obtaining the nitrogenous bases from the petroleum distillate in which they are present is as follows: The supernatant oily layer is very carefully separated from the aqueous layer. A good separation of the two layers is essential as the aqueous layer contains considerable amounts of dissolved carbonates and bicarbonates which generate large volumes of $CO_2$ on contact with acid. The oily layer is then extracted with a sufficient amount of 20% sulphuric acid to extract all of the nitrogen bases present therein. The acid may be added all at once or the extraction may be performed in stages, i. e., only a fraction of the required amount of acid is added at any one time. The acid extracts are separated from the petroleum oil and on addition of sufficient amounts of caustic thereto, a mixture of free nitrogen bases is obtained.

The type of lubricating oil used for the pyrogenic distillation of the cottonseed meal is not of primary importance. Excellent results are obtained by using the Pennsylvania oil referred to above but very analogous results are also obtained by using other lubricating oils or petroleum distillates, even those containing considerable amounts of nitrogen. The choice of an oil or petroleum distillate which does not undergo considerablbe cracking at elevated temperatures offers decided economies. It is considered desirable to use as little of the petroleum oil as possible since this yields the various bases in a more concentrated form. Experiments indicated that about 800 c.c. of bases may be obtained from 100 pounds of cottonseed meal.

The following additional example is illustrative of the large scale operation of my process:

*Example II*

A lubricating oil reducing shell still which measured internally 29 feet long and 8 feet in diameter was charged with 95 barrels of light lubricating oil which had been previously neutralized with caustic soda solution. The oil had an acid number of 0.10 to phenolphthalein, and contained 0.023% of nitrogen and only a trace of ash.

The cottonseed meal was next charged to the still, air from the spider of the still being used for agitation and mixing. In all 461 sacks of meal were introduced into the still, so that the latter at the time the operations were commenced contained 45,600 pounds of cottonseed meal and 4,000 gallons of oil. The cottonseed meal contained 6.45% of nitrogen, 40.3% of protein (calculated) and 6.4% of oil.

After charging the still, the fire was started under the same and the heating continued for approximately seven days. Critical data regarding the pyrolytic distillation are shown graphically in the accompanying drawing which shows the vapor line temperature, the percent distilled over and the gravity of the stream. From the curves it is evident that most of the distillate was collected within four days after the fire was started under the still. The vapor temperature and gravity of the upper layer of the condensate were checked at two hour intervals and these data are also presented on the chart. Upon completion of the distillation, the still was allowed to cool for four days before it was opened. Care should be taken on opening the still to prevent the ignition of the carbonaceous residue.

The total condensate collected amounted to 116 barrels of 42 gallons each and this condensate was separated into three portions. The first portion consisted of 29 barrels of water solution, the second 5 barrels of tar and the third portion consisted of 82 barrels of oil. The oil layer was treated successively with four 420–440 gallon charges of 16–18% sulphuric acid, prepared by diluting 98% acid with fresh water. The average $H_2SO_4$ content of the dilute acid pumped into the agitator was 16.9%, while the combined acid waters withdrawn from the agitator and mixed in another agitator contained 15.3% of sulphuric acid, all of these titrations being made by the use of methyl orange as an indicator. During the addition of each of the four acid charges, and for one hour thereafter, the contents of the agitator were agitated to a moderate degree with air. A total of approximately two barrels of sludge was removed from the agitator during the drawing off of the acid waters, this sludge being collected principally when the first three acid dumps were drawn off. Approximately one-third of the acid sludge was found at the bottom of the cone of the agitator while the rest was floating upon the surface of the aqueous phase.

The volume of the combined acid waters drawn off was 1600 gallons, and these combined acid waters were neutralized with a slight excess of alkali, using 4300 pounds of 44.4% caustic soda solution, the neutralization being carried out over a period of two days to allow time for the dissipation of the heat evolved during the reaction. During this time, the temperature of the agitator contents at no time exceeded 120° F. No appreciable separation of bases occurred until the strength of the acid was reduced below 2% of $H_2SO_4$. The aqueous phase contained 0.2% of caustic soda after the 4300 pounds of strong caustic soda solution had been added, and laboratory experiments showed that more bases could not be precipitated by the addition of more caustic soda. The 625 pounds of crude, black, viscous oil-soluble bases which were collected when the fully neutralized acid water was drawn off were transferred to the laboratory for distillation. These bases contained 12.5% of water and 10.3% of nitrogen. Other data appear in Table I.

TABLE I

*Data respecting the treatment of the oil layer of the condensate from the cottonseed meal distillation*

| | |
|---|---|
| Volume of oil condensate | 82 barrels |
| Approximate weight of oil condensate | 26,000 pounds |
| Weight of diluted $H_2SO_4$ added | 15,800 pounds |
| Strength of diluted $H_2SO_4$ added | 16.9 percent |
| Weight of acid water removed | 15,000 pounds |
| Strength of acid water removed | 15.3 percent |
| Weight of strong NaOH solution added | 4,300 pounds |
| Strength of strong NaOH solution added | 44.4 percent |
| Basicity of mix after adding NaOH | 0.2 percent (NaOH) |
| Weight of crude bases collected | 625 pounds |
| Water present in crude bases | 12.5 percent |
| Nitrogen present in crude bases | 10.3 percent |
| Solubility of crude bases in petroleum ether (a). | 13.0 percent |
| Specific gravity of crude bases at 60° F | 1.102 |

(a) Solubility of crude bases in 100 volume percent of petroleum ether of 86° A. P. I. gravity, %.

The five barrels of tar contained a considerable amount of occluded water and some oil. Compounds dissolved in the water, such as carbonates and carbamates, caused violent ebullition of the charge upon the addition of the dilute sulphuric acid, and, for this reason, only a relatively small amount of the tar could be treated at a given time until the emulsion was broken and the occluded water drawn off. Therefore, small portions of the tar were treated in two two-barrel agitators with 10% charges of approximately 16% sulphuric acid, and as much water as possible was drawn off. This water was alkaline to litmus. A small amount of oil separated from the tar, also, and it was skimmed from the surface and returned to an agitator in which the extraction of bases from the mineral oil layer was being made at the same time. After completing this preliminary work, the tar was treated with four more dumps of acid, and the acid waters were then made just alkaline to phenolphthalein and the bases removed. A fifth extraction was not considered necessary inasmuch as an additional acid extract of samples of fourth-extracted tar did not yield an appreciable amount of bases, upon neutralization. Table II contains data relative to the treatment of the tar.

TABLE II

*Data respecting the treatment of the tar layer of the condensate from the cottonseed meal distillation*

| | |
|---|---|
| Volume of tar condensate | 5 barrels |
| Approximate weight of tar condensate | 1,800 pounds |
| Weight of dilute $H_2SO_4$ added | 2,440 pounds |
| Strength of dilute $H_2SO_4$ added | 16 percent. |
| Weight of acid water removed | 2,650 pounds. |
| Strength of acid water removed | 10 percent. |
| Weight of strong NaOH added | 495 pounds. |
| Strength of strong NaOH added | 44.4 percent |
| Condition of final aqueous phase | Neutral (a) |
| Weight of crude bases collected | 310 pounds |
| Water present in crude bases | 29.0 percent |
| Nitrogen present in crude bases | 10.9 percent |
| Solubility of crude bases in petroleum ether (b) | 0.6 percent |
| Specific gravity of crude bases at 60° F | 1.117 |

(a) The NaOH solution was added until the acid water was made alkaline to phenolphthalein.
(b) Solubility of crude bases in 100 volume percent of petroleum ether of 86° A. P. I. gravity, %.

The 310 pounds of crude bases derived from the tar were black and viscous and similar in appearance to the oil layer bases. The crude tar bases contained 29.0% of water and 10.9% of nitrogen. The bases freed from the tar as well as from the oil layer may be fractionally distilled under vacuum into a plurality of cuts. It is deemed preferable to carry out the distillation under vacuum as a number of the basic nitrogenous compounds, obtained as described above, ten to decompose at the higher temperatures required for distillation under normal pressure.

The vacuum distillation of the bases derived from the oil layer was accomplished first, a one-barrel laboratory shell still being utilized for this purpose. The column of the still was 9 feet in height and 0.5 feet in diameter and was filled with vitrified cylindrical packing. The vapor line led to a water-cooled worm condenser and the condensate was collected in two closed receivers which were filled alternately. The vacuum pump was capable of reducing the pressure of the system to 40 to 50 millimeters of mercury. A pilot distillation indicated that, with some care to avoid foaming, no trouble should be encountered in the distillation of the crude bases, and, therefore, the still was charged with roughly one-half of the 625 pounds of oil-soluble bases and the charge was dewatered at pressures of 760-610 mm. of mercury and still temperatures as high as 275° F. The pressure was then reduced to 40 mm. of mercury and the bases were removed in 5 cuts, the initial column temperature being 250° F. The latter part of the last cut was extremely viscous. The maximum still temperature was 600° F.

The distillation of the remainder of the oil-soluble bases was similar to that of the first except in that the still temperature reached a maximum of 550° F. and that the condenser was run somewhat warmer, which facilitated the drainage of the last cut from the condenser. The bottoms obtained from these distillations were hard, black, brittle materials much like a hard grade of asphalt.

The tar-layer bases were next distilled in the same apparatus. A pilot distillation indicated that the charge possessed a strong tendency to foam, especially immediately following the removal of the water, and again towards the end of the distillation of the bases. The 310 pounds of crude bases were de-watered under a gradually decreasing pressure, the final pressure in the still being 80 mm. of mercury and the column temperature at the same time being 210° F. Thereafter, the pressure in the still was reduced to 50 mm. of mercury and the initial distillate from the tar bases was at a column temperature of 260° F. The distillation then proceeded until the still temperature had reached a maximum of 585° F. and the column temperature was 445° F., the pressure throughout remaining at 50 mm. of mercury. During the distillation of the tar bases in the one-barrel still, no trouble was experienced through foaming, but upon opening the still, it was observed that the contents were hard, black, brittle and compact for the most part, although the upper portion of the residue had solidified with a very porous structure.

It will be observed in Table III, which contains the analytical data respecting the more important of the various products, that the tar bases, particularly the redistilled bases, were somewhat soluble in petroleum ether of 86° A. P. I. gravity, but it is not believed that this was due, to any material extent, to contamination in the condenser of the bases removed from the tar layer, but, more probably, to the contamination of these bases in the crude state due to the fact that the original tar layer contained occluded oil.

TABLE III

Results of tests upon the materials produced by the destructive distillation of cottonseed meal

| Material | Nitrogen content, percent | Water content, percent | Solubility in 100 volume percent of petroleum ether of 86° A. P. I. gravity, percent (a) | Gravity, specific gravity at 60° F. |
|---|---|---|---|---|
| Oil layer of orig. condensate | 0.85 | ---------- | 100 | 0.901 |
| Tar layer of orig. condensate | 6.1 | 22.6 | 15 | 1.048 |
| Water layer of orig. condensate | 4.7 | ---------- | ---------------- | 1.066 |
| Oil layer after acid extraction | 0.30 | Trace | 100 | 0.898 |
| Tar layer after acid extraction | 1.10 | 40.0 | 16 | 0.935 |
| Crude bases from oil layer | 10.3 | 12.5 | 13 | 1.102 |
| Crude bases from tar layer | 10.9 | 29.0 | 0.6 | 1.117 |
| Cut No. 1 of distilled oil bases | 9.7 | ---------- | 98.0 | 0.996 |
| Cut No. 2 of distilled oil bases | 11.4 | ---------- | 79.0 | 1.044 |
| Cut No. 3 of distilled oil bases | 12.1 | ---------- | 18.0 | 1.082 |
| Cut No. 1 of distilled tar bases | 10.9 | ---------- | 12.0 | 1.037 |
| Cut No. 2 of distilled tar bases | 14.5 | ---------- | 4.5 | 1.055 |
| Cut No. 3 of distilled tar bases | 14.3 | ---------- | 3.9 | 1.069 |
| Bottoms from distillation of oil bases | 6.6 | ---------- | ---------------- | ---------- |
| Bottoms from distillation of tar bases | 11.3 | ---------- | ---------------- | ---------- |

(a) These values were calculated from the weights of the materials dissolved in 25 cc. of gasoline of 86-88° A. P. I. gravity, after shaking a 25 cc. sample of the original material, at temperatures of 75-77° F., and allowing the two layers to separate for a period of one hour. A correction in the calculations for the gasoline remaining in the lower layer was applied in cases where all of the solvent was not recovered in the upper layer.

Subsequent to completing the vacuum distillations, the bases which were derived from the oil were composited into three cuts, and the bases derived from the tar were likewise composited separately into three cuts. The critical data regarding these cuts are presented in Table IV:

sisted principally of ammonium carbamate and substituted carbamates.

The ammonium carbamate and substituted carbamates are useful in the manufacture of a number of substances such as adrenaline. In addition, urea may be obtained from the ammonium carbamate. This compound is valuable as crude material in the manufacture of plastics by condensing it with formaldehyde.

The nitrogen bases, soluble in petroleum ether, especially quinoline and substituted quinolines, are valuable as dye intermediates. A process for manufacturing quinphthalone dyes from a number of quinolines, especially of a mixture thereof has been disclosed in my copending application Serial No. 628,770.

The carbon residue remaining in the still after completion of the pyrogenic distillation of the protein material is present in a highly activated form as previously stated. It may be used to good advantage as a decolorant. Excellent results have been obtained with this carbon in the decoloration of sulphanilic acid.

The examples given above are merely illustrative of the generic invention and are not to be considered as limitations thereon as many variations within the scope of the appended claims will be obvious to those skilled in the art.

I claim:

1. A process for decomposing protein materials which comprise pyrolytically distilling said protein materials while suspended in a mineral oil.

2. A process for decomposing cottonseed meal which comprises pyrolytically distilling said cottonseed meal while suspended in a mineral oil.

3. A process for obtaining basic nitrogenous compounds which comprises pyrolytically distilling protein materials while suspended in a mineral oil and recovering said nitrogenous compounds from the overhead distillate.

4. A process for obtaining basic nitrogenous compounds which comprises pyrolytically distilling protein materials while suspended in a mineral oil, separating the overhead distillate into an oily layer and an aqueous layer and recovering the said basic nitrogenous compounds from the said oily and aqueous layers.

5. A process for obtaining basic nitrogenous compounds which comprises pyrolytically distilling cottonseed meal while suspended in a mineral oil, separating the overhead distillate into an oily and an aqueous layer and recovering the said

TABLE IV

Data respecting the final purification of the nitrogen bases by distillation under pressures of 40-50 millimeters of mercury

| Origin of bases | Weight of crude bases, pounds | Water recovered, pounds | Cut No. 1 | | | Cut No. 2 | | | Cut No. 3 | | | Weight of still bottoms, pounds | Recovery percent (a) |
|---|---|---|---|---|---|---|---|---|---|---|---|---|---|
| | | | Weight, pounds | Final still temperature, °F. | Final Col. temperature, °F. | Weight, pounds | Final still temperature, °F. | Final Col. temperature, °F. | Weight, pounds | Final still temperature, °F. | Final Col. temperature, °F. | | |
| Oil | 625 | 198 | 82 | 405 | 320 | 80 | 504 | 416 | 61 | 600 | 462 | 134 | 88.7 |
| Tar | 310 | 107 | 34 | 428 | 350 | 26 | 470 | 392 | 34 | 585 | 445 | 75 | 89.0 |

(a) The recovery is based upon the weights of all of the recovered products, and upon the weight of the crude bases. The unrecovered portion was probably represented largely by the uncondensed vapors lost in the vacuum pump discharge.

In addition, a sample weighing approximately 0.5 pounds of a white deposit was removed from the inside of the lookbox during the distillation of cottonseed meal. This white material conbasic nitrogenous compounds from the said oily and aqueous layers.

6. A process for obtaining basic nitrogenous compounds which comprises pyrolytically distilling cottonseed meal up to a maximum temperature of approximately 590° F. while suspended in mineral oil, separating the distillation products into an oily and an aqueous layer and recovering the said basic nitrogen compounds from the said oily and aqueous layers.

7. A process for obtaining basic nitrogenous compounds which comprises pyrolytically distilling cottonseed meal while suspended in a mineral oil, separating the overhead distillate into an oily and aqueous layer, extracting the said basic nitrogenous compounds from the oily layer with a dilute acid and recovering the said basic nitrogenous compounds from the acid extracts by the addition of an inorganic base.

8. A process for obtaining basic nitrogenous compounds which comprises pyrolytically distilling cottonseed meal while suspended in a mineral oil, separating the overhead distillate into an oily and an aqueous layer, and recovering the said basic nitrogenous compounds from the said aqueous layer by the addition of an inorganic base.

9. A process for obtaining basic nitrogenous compounds which comprises pyrolytically distilling cottonseed meal while suspended in a mineral oil, separating the overhead distillate into an oily and an aqueous layer, extracting the said oily layer with liquid sulphur dioxide to obtain an extract containing a higher concentration of nitrogen bases than was present in the original oily layer, commingling this extract with water to obtain an aqueous solution of the acid sulphite salts of the bases and adding a basic material to the said aqueous solution to free the nitrogen bases.

10. A process for obtaining basic nitrogenous compounds which comprises pyrolytically distilling cottonseed meal while suspended in a mineral oil, separating a basic tar from the overhead distillate, extracting the said basic nitrogenous compounds from the said tar with a dilute acid and recovering the said basic nitrogenous compounds from the acid extract by the addition of an inorganic base.

11. A process for obtaining basic nitrogenous compounds which comprises pyrolytically distilling cottonseed meal while suspended in a mineral oil, separating a basic tar from the overhead distillate, extracting said basic tar with liquid sulphur dioxide to obtain an extract containing a higher concentration of nitrogen bases than was present in the original basic tar, commingling this extract with water to obtain an aqueous solution of the acid sulphite salts of the bases and obtaining the free nitrogen bases by the addition of an inorganic base to the said aqueous solution.

12. A process for obtaining ammonium carbamate and substituted carbamates which comprises pyrolytically distilling protein materials while suspended in a mineral oil and recovering the said ammonium carbamate and substituted carbamates.

13. A process for obtaining ammonium carbamate and substituted carbamates which comprises pyrolytically distilling cottonseed meal while suspended in a mineral oil and recovering the said ammonium carbamate and substituted carbamates as a sublimate in the colder regions of the still.

14. A process for obtaining ammonium carbamate and substituted carbamates which comprises pyrolytically steam distilling cottonseed meal while suspended in a mineral oil and recovering said ammonium carbamate and substituted carbamates from the aqueous fraction of the overhead distillate.

15. A process for obtaining carbon in a high state of activation which comprises pyrolytically distilling protein materials while suspended in a mineral oil until all volatile products have been removed.

16. A process for obtaining carbon in a high state of activation which comprises pyrolytically distilling cottonseed meal while suspended in a mineral oil until all volatile products have been removed.

17. A process for decomposing protein materials which comprises pyrolytically distilling said protein materials in the presence of a quantity of mineral oil sufficient to act as a carrier for the volatile products resulting from the said pyrolytic distillation and to act as a suspending agent for the undecomposed materials.

18. A process for obtaining basic nitrogenous compounds which comprises pyrolytically distilling protein materials in the presence of a quantity of mineral oil sufficient to act as a carrier for the overhead products resulting from said pyrolytic distillation and to act as a suspending agent for the undecomposed materials, separating the overhead distillates into an oily layer and an aqueous layer and recovering the said basic nitrogenous compounds from the said oily and aqueous layers.

19. A process for obtaining basic nitrogenous compounds which comprises pyrolytically distilling cottonseed meal in the presence of a quantity of mineral oil sufficient to act as a carrier for the overhead products resulting from said pyrolytic distillation and to act as a suspending agent for the undecomposed materials, separating the overhead distillates into an oily layer and an aqueous layer and recovering the said basic nitrogenous compounds from the said oily and aqueous layers.

20. A process for obtaining basic nitrogenous compounds which comprises pyrolytically distilling cottonseed meal up to a maximum temperature of approximately 590° F. in the presence of a quantity of mineral oil sufficient to act as a carrier for the volatile products resulting from the said pyrolytic distillation and to act as a suspending agent for the undecomposed materials, separating the distillation products into an oily and an aqueous layer and recovering the said basic nitrogenous compounds from the said oily and aqueous layers.

21. A process for obtaining ammonium carbamate and substituted carbamates which comprises pyrolytically steam distilling cottonseed meal in the presence of a quantity of mineral oil sufficient to act as a carrier for the overhead products resulting from the said pyrolytic distillation and to act as a suspending agent for the undecomposed materials and recovering the said ammonium carbamate and substituted carbamates in the colder regions of the still.

22. A process for obtaining carbon in a high state of activation which comprises pyrolytically distilling cottonseed meal in the presence of a quantity of mineral oil sufficient to act as a carrier for the volatile products and to act as a suspending agent for the undecomposed materials.

23. A process for obtaining quinoline and alkyl substituted quinolines which comprises pyrolytically distilling protein materials while suspended in a mineral oil to produce said quinoline and alkyl substituted quinolines, separating the overhead distillate into oily and aqueous layers and recovering said quinoline and alkyl substituted quinolines therefrom.

24. A process for obtaining quinoline and alkyl substituted quinolines which comprises pyroltically distilling cottonseed meal in the presence of a quantity of mineral oil sufficient to act as a carrier for the overhead products resulting from said pyrolytic distillation and to act as a suspending agent for the undecomposed materials to produce said quinoline and alkyl substituted quinolines, separating the overhead distillate into oily and aqueous layers, extracting said quinoline and alkyl substituted quinolines from the oily layer with a dilute acid and recovering said quinolines from the acid extracts by the addition of an inorganic base.

JAMES R. BAILEY.